(12) United States Patent  
Lee

(10) Patent No.: US 8,044,878 B2  
(45) Date of Patent: Oct. 25, 2011

(54) SIGNAL RECEIVING APPARATUS, DISPLAY APPARATUS AND CONTROL METHOD THEREOF

(75) Inventor: Chang-jin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 721 days.

(21) Appl. No.: 11/772,490

(22) Filed: Jul. 2, 2007

(65) Prior Publication Data

US 2008/0055190 A1 Mar. 6, 2008

(30) Foreign Application Priority Data

Sep. 4, 2006 (KR) .................... 10-2006-0084648

(51) Int. Cl.  
*G09G 5/00* (2006.01)

(52) U.S. Cl. ............ 345/2.3; 345/2.1; 345/1.1; 715/716

(58) Field of Classification Search ............ 345/1.1–3.3, 345/156, 168–173, 520  
See application file for complete search history.

(56) References Cited

U.S. PATENT DOCUMENTS

| 6,052,750 | A | 4/2000 | Lea |
| 7,590,412 | B2 * | 9/2009 | Sakamoto .................. 455/414.1 |
| 7,639,907 | B2 * | 12/2009 | Elberbaum ..................... 385/24 |
| 7,663,569 | B2 * | 2/2010 | Ono ............................... 345/2.3 |
| 7,702,323 | B2 * | 4/2010 | Sakamoto ..................... 455/420 |
| 2005/0210390 | A1 | 9/2005 | Ono |
| 2006/0117115 | A1 | 6/2006 | Jo et al. |
| 2006/0150222 | A1 | 7/2006 | McCafferty et al. |
| 2007/0044025 | A1 | 2/2007 | Sakamoto |

FOREIGN PATENT DOCUMENTS

| CN | 1198634 A | 11/1998 |
| CN | 1599431 A | 3/2005 |
| CN | 1664911 A | 9/2005 |
| EP | 1134645 A1 | 9/2001 |
| EP | 1622360 A1 | 2/2006 |
| JP | 7-327278 A | 12/1995 |
| JP | 8-18813 A | 1/1996 |
| JP | 2002-354450 A | 12/2002 |
| KR | 10-1997-0025012 A | 5/1997 |
| KR | 10-1998-0078491 A | 11/1998 |
| KR | 10-1999-0032156 A | 5/1999 |
| KR | 10-2002-0095860 A | 12/2002 |
| KR | 10-2005-0122257 A | 12/2005 |
| KR | 10-2006-0059354 A | 6/2006 |
| WO | 03026187 A2 | 3/2003 |

OTHER PUBLICATIONS

Search Report dated Oct. 26, 2009 issued in counterpart EP application No. 07113254.2.  
Communication from the State Intellectual Property Office of P.R. China issued Sep. 1, 2010, in counterpart Chinese Application No. 200710143145.7.  
Korean Office Action issued on Jan. 19, 2011 in the corresponding Korean Patent Application No. 10-2006-0084648.

* cited by examiner

*Primary Examiner* — Duc Dinh  
(74) *Attorney, Agent, or Firm* — Sughrue Mion, PLLC

(57) ABSTRACT

A signal receiving apparatus includes: a communication part which communicates with a plurality of display apparatuses, and a controller which determines whether at least one of the plurality of display apparatuses is connected to the signal receiving apparatus, and, if it is determined that the at least one display apparatus is connected to the signal receiving apparatus, controls connection information related to a connection state of the display apparatus to be provided to at least one of the plurality of display apparatuses.

20 Claims, 5 Drawing Sheets

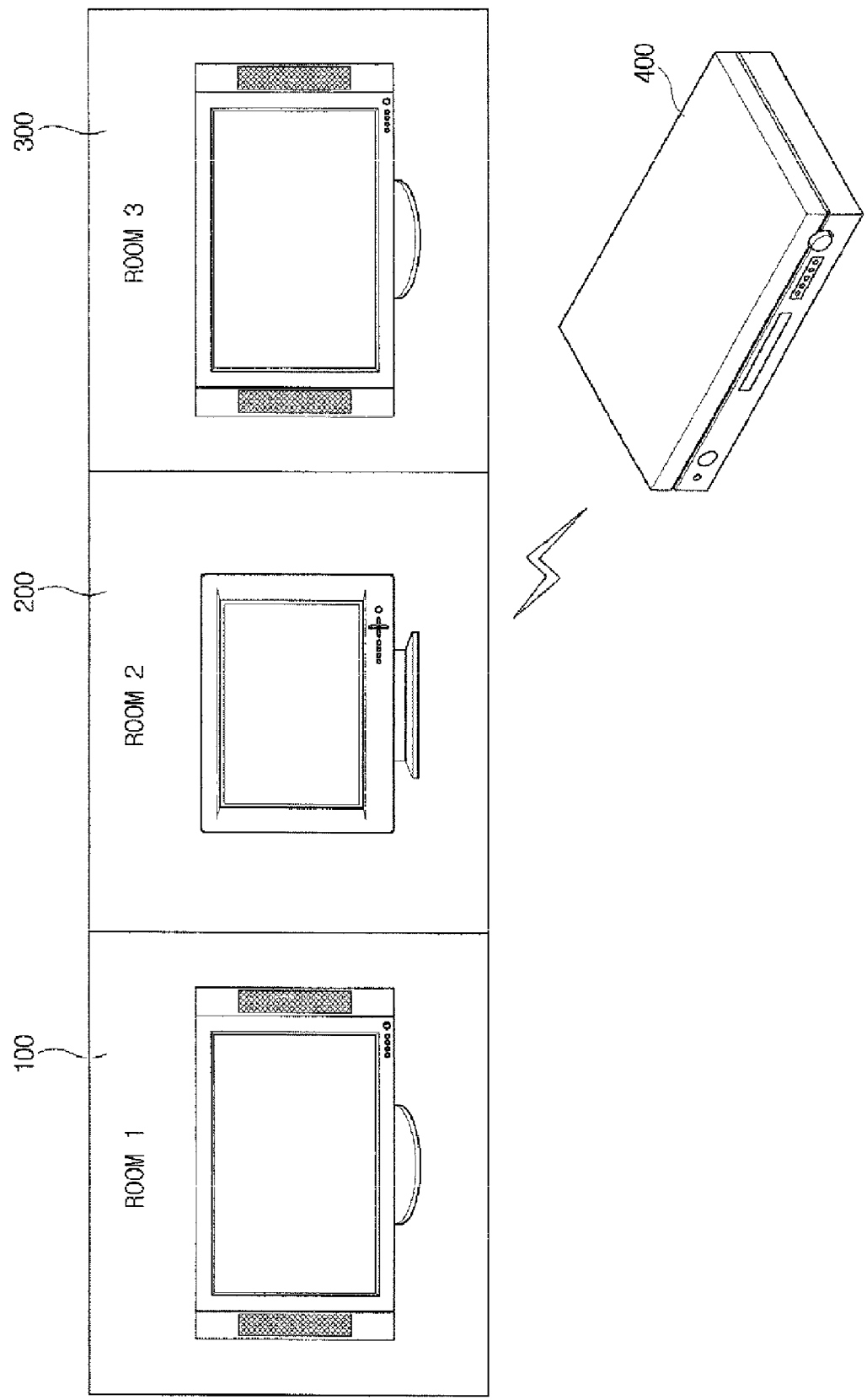

SIGNAL RECEIVING APPARATUS, DISPLAY APPARATUS AND CONTROL METHOD THEREOF

CROSS-REFERENCE TO RELATED APPLICATIONS

This application claims priority from Korean Patent Application No. 2006-0084648, filed on Sep. 4, 2006, in the Korean Intellectual Property Office, the disclosure of which is incorporated herein by reference in its entirety.

BACKGROUND

1. Technological Field

Apparatuses and methods consistent with the present invention relate to signal receiving apparatuses, display apparatuses and control methods thereof, and more particularly, to a signal receiving apparatus and a display apparatus, which are capable of communicating with each other wirelessly and a control method thereof.

2. Description of the Related Art

In general, a display apparatus, such as a monitor, a TV, etc., is used for various fields. The display apparatus processes an image signal provided from an external apparatus, such as a computer, a digital versatile disk (DVD) player or the like, or provided by a broadcasting signal provided from a broadcasting station or the like, and displays an image on a screen.

In addition, the display apparatus may be connected to a set-top box that receives a broadcasting signal via wires, a cable TV or a satellite broadcasting, and processes the broadcasting signal provided from the set-top box for display of an image on the screen.

In recent years, there has been suggested a wireless TV system in which a display apparatus is connected to a set-top box wirelessly. The wireless TV system includes a display apparatus having a wireless receiver (hereinafter referred to as an "Rx module") and a set-top box having a wireless transmitter (hereinafter referred to as a "Tx module"). The set-top box receives an image signal from a broadcasting station or the like, and the display apparatus receives the image signal from the set-top box and then displays the image signal on a screen.

At this time, in order for the display apparatus to communicate with the set-top box wirelessly, a media access control (MAC) address of the Rx module must be equal to that of the Tx module. That is, when the display apparatus is powered on, and then, power is applied to the Rx module, the Rx module searches the Tx module having the same MAC address as the MAC address of the Rx module. When communication between the Rx module and the Tx module is successful and the display apparatus is wirelessly connected to the set-top box, the set-top box informs a user that wireless communication is established between the display apparatus and the set-top box, by using an LED or the like provided at the front of the set-top box.

In such a conventional TV system, the display apparatus is connected to the set-top box in a one-to-one correspondence. However, if a plurality of display apparatuses are connected to one set-top box, it is very difficult to indicate which of the display apparatuses communicates with the set-top box wirelessly.

For example, assuming that wireless communication is established between a plurality of display apparatuses, which are provided in separate areas, and one set-top box, if the set-top box indicates that one of the display apparatuses is connected to the set-top box by using an LED, a user may not know which of display apparatuses is connected to the set-top box.

In addition, if the display apparatus is not placed in the same area as the set-top box, a user has to directly confirm whether or not the display apparatus is wirelessly connected to the set-top box.

SUMMARY OF THE INVENTION

Accordingly, it is an aspect of the present invention to provide a signal receiving apparatus and a display apparatus, which are capable of informing a user which of a plurality of display apparatuses is wirelessly connected to a set-top box, and a control method thereof.

Aspects of the present invention can be achieved by providing a signal receiving apparatus comprising: a communicating part which communicates with a plurality of display apparatuses; and a controller which determines whether at least one of the plurality of display apparatuses is connected to the signal receiving apparatus through the communicating part, and, if it is determined that the at least one display apparatus is connected to the signal receiving apparatus, controls connection information related to a connection state of the respective display apparatuses to be provided to at least one of the plurality of display apparatuses through the communicating part.

According to an exemplary embodiment of the present invention, when the plurality of display apparatuses is connected to the signal receiving apparatus through the communicating part, the controller provides the connection information to the plurality of connected display apparatuses and controls the plurality of display apparatuses to display the connection state of the plurality of display apparatuses.

According to an exemplary embodiment of the present invention, when the plurality of display apparatuses is connected to the signal receiving apparatus through the communicating part, the controller provides the connection information to one of the plurality of connected display apparatuses.

According to an exemplary embodiment of the present invention, one of the plurality of display apparatuses to which the connection information is provided is preset by a user.

According to an exemplary embodiment of the present invention, the signal receiving apparatus further comprises a display part, wherein the controller controls the connection information to be displayed on the display part.

According to an exemplary embodiment of the present invention, the communicating part complies with IEEE 802.11A communication standards.

Aspects of the present invention can be achieved by providing a display apparatus which receives an image signal from a signal receiving apparatus and displays an image based on the received image signal, comprising: a communicating part which communicates with the signal receiving apparatus; a display part; and a controller which receives connection information from the signal receiving apparatus through the communicating part, and controls a state of connection between the display apparatus and the signal receiving apparatus to be displayed on the display part, based on the received connection information.

According to an exemplary embodiment of the present invention, the display apparatus further comprises a user interface (UI) generating part, wherein the display part comprises a display, and wherein the controller controls the UI generating part to display the connection information on the display.

According to an exemplary embodiment of the present invention, the display part comprises at least one LED, wherein the controller controls the connection information to be displayed through the LED.

According to an exemplary embodiment of the present invention, the communicating part complies with IEEE 802.11A communication standards.

The aspects of the present invention can be achieved by providing a control method of a signal receiving apparatus having a communicating part which communicates with a plurality of display apparatuses, comprising: determining whether at least one of the plurality of display apparatuses is connected to the signal receiving apparatus through the communicating part; and if it is determined that the at least one display apparatus is connected to the signal receiving apparatus, providing connection information related a connection state of the respective display apparatuses to at least one of the plurality of display apparatuses through the communicating part.

According to an exemplary embodiment of the present invention, the providing the connection information comprises providing the connection information to the plurality of connected display apparatuses so that the respective display apparatuses display the connection state of the plurality of display apparatuses.

According to an exemplary embodiment of the present invention, the providing the connection information comprises: setting a display apparatus to be provided with the connection information; and providing the connection information to the set display apparatus.

According to an exemplary embodiment of the present invention, the control method further comprises preparing a display part, wherein the providing the connection information comprises displaying the connection information on the display part.

According to an exemplary embodiment of the present invention, the communicating part complies with IEEE 802.11A communication standards.

Aspects of the present invention can be achieved by providing a control method of a display apparatus which receives an image signal from a signal receiving apparatus and displays an image based on the received image signal, comprising: receiving connection information from the signal receiving apparatus; and displaying a state of connection between the display apparatus and the signal receiving apparatus, based on the received connection information.

According to an exemplary embodiment of the present invention, the displaying the state of connection comprises displaying the connection information as a predetermined message.

According to an exemplary embodiment of the present invention, the displaying the state of connection comprises displaying the connection information through an LED.

According to an exemplary embodiment of the present invention, the communication between the display apparatus and the signal receiving apparatus complies with IEEE 802.11A.

BRIEF DESCRIPTION OF THE DRAWINGS

Aspects of the present invention will become apparent and more readily appreciated from the following description of exemplary embodiments, taken in conjunction with the accompanying drawings, in which:

FIG. 3 is a perspective view of a display system according an exemplary embodiment of the present invention;

DETAILED DESCRIPTION OF EXEMPLARY EMBODIMENTS

Reference will now be made in detail to exemplary embodiments of the present invention, examples of which are illustrated in the accompanying drawings.

Figure 1:
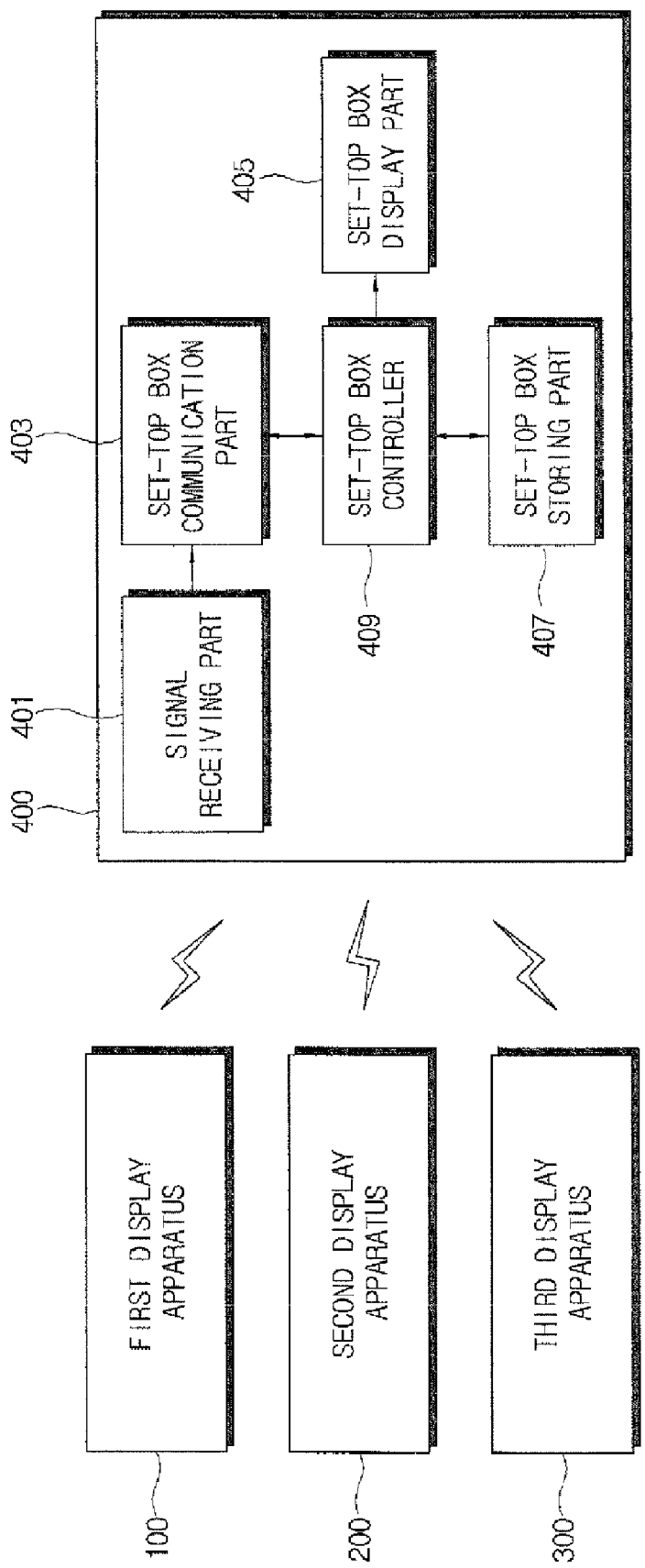
FIG. 1 is a control block diagram of a display system according to an exemplary embodiment of the present invention.

FIG. 1 is a control block diagram of a display system according to an exemplary embodiment of the present invention. A display system according to an exemplary embodiment of the present invention comprises a plurality of display apparatuses 100, 200 and 300 and a signal receiving apparatus 400.

The signal receiving apparatus 400 is an external apparatus that receives an image signal, communicates with the display apparatuses 100, 200 and 300, and provides the received image signal to the display apparatuses 100, 200 and 300. Hereinafter, the signal receiving apparatus 400 will be illustrated with a set-top box, but the signal receiving apparatus 400 may be embodied in many other forms, as will be understood by those of ordinary skill in the art.

As shown in FIG. 1, according to a first exemplary embodiment of the present invention, a set-top box 400 comprises a signal receiving part 401, a set-top box communication part 403, a set-top box display part 405, a set-top box storing part 407 and a set-top box controller 409.

The signal receiving part 401 comprises a tuner unit (not shown) that receives a broadcasting signal. In this exemplary embodiment, the tuner unit (not shown) may be embodied by one or more tuners, a demodulator that demodulates a tuned signal, a decoder, a multiplexer and the like. When a tuning control signal is provided from one of the display apparatuses 100, 200 and 300, which will be described in greater detail below, through the set-top box communication part 403, a broadcasting signal having a frequency band corresponding to the tuning control signal is tuned. The tuned broadcasting signal is received in the form of a packeted transport stream produced by time division-multiplexing a video signal, an audio signal and various data.

For example, in case of a digital broadcasting signal, the demodulator outputs a received digital broadcasting signal in the form of a transport stream through a vestigial side band (VSB) demodulation process, an error correction process, etc. In this case, the tuner unit (not shown) comprises a multi-tuner, that is, an analog tuner and a digital tuner that receive an analog broadcasting signal and a digital broadcasting signal, respectively.

The set-top box communication part 403 wirelessly communicates with the display apparatuses 100, 200 and 300 and corresponds to a communication part 11 (see FIG. 2) provided in each of the display apparatuses 100, 200 and 300. The set-top box communication part 403 may comprise a wireless transmitter (hereinafter referred to as a Tx module) to meet IEEE 802.11A standards. In this exemplary embodiment, the Tx module has identification information used to communicate with the plurality of display apparatuses 100, 200 and 300, which will be described in greater detail below.

In addition, when the set-top box communication part 403 is connected to one of the display apparatuses 100, 200 and 300, the set-top box communication part 403 may provide the set-top box controller 409 with a connecting signal indicating that the set-top box communication part 403 is connected to one of the display apparatuses 100, 200 and 300.

The set-top box storing part 407 stores the identification information to distinguish among devices that perform the same function as the set-top box 400. The set-top box storing part 407 may be embodied by a register, an electrically erasable programmable read-only memory (EEPROM), an erasable programmable read-only memory (EPROM) and the like, or any device which can store the identification information.

In this exemplary embodiment, the identification information comprises a Media Access Control (MAC) address of the Tx module, which is used to communicate with the display apparatuses 100, 200 and 300, and may be set and stored by a user during the manufacture of the set-top box.

The identification information of the set-top box communication part 403 may be stored in plural numbers in the set-top box storing part 407 for communication with the plurality of display apparatuses 100, 200 and 300. The set-top box 400 communicates with one of the display apparatuses 100, 200 and 300, which has the same identification information as the identification information stored in the set-top box storing part 407.

Accordingly, in order for the set-top box 400 to communicate with the plurality of display apparatuses 100, 200 and 300, identification information having the same address as the identification information of the plurality of display apparatuses 100, 200 and 300 must be stored in the set-top box storing part 407 beforehand. Thus, when a display apparatuses to be wirelessly connected to the set-top box 400 is changed, the identification information stored in the set-top box part 407 must be also changed accordingly. For example, the identification information may be changed by a user.

When one of the display apparatuses 100, 200 and 300 is connected to the set-top box 400 through the set-top box communication part 403, the set-top box controller 409 provides connection information to the connected display apparatus 100, 200 or 300. The set-top box controller 409 may be embodied, for example, by a controller such as a microcomputer, a central processing unit (CPU), or the like.

Specifically, upon receiving a connection signal from the set-top box communication part 403, the set-top box controller 409 determines which of the identification information of the Tx module of the set-top box communication part 403 is identification information corresponding to the connected display apparatus 100, 200 or 300. At this time, at least one display apparatus 100, 200 and 300 may be connected to the set-top box communication part 403, and the set-top box 400 provides all of the connected display apparatuses 100, 200 and 300 with the connection information indicating that the display apparatuses 100, 200 and 300 are connected to the set-top box 400.

In this exemplary embodiment, the connection information comprises information related to which of the display apparatuses 100, 200 and 300, which can communicate with the set-top box 400, is connected to the set-top box 400, and may further comprise information related to a connection state.

On the other hand, the set-top box controller 409 can provide the connection information to only one of the connected display apparatuses 100, 200 and 300. Such an individual display apparatus to which the connection information is provided may be set by a user, for example.

If the display apparatus to which the connection information is provided is set, then the set-top box controller 409 provides the connection information to the set display apparatus. On the contrary, if the display apparatus to which the connection information is provided is not set or is not connected to the set-top box 400, then the connection information is provided to all connected display apparatuses.

In addition, upon receiving the identification information of the Tx module from a user, the set-top box controller 409 controls the set-top box storing part 407 to store the received identification information.

Further, when a connected display apparatus is disconnected from the set-top box 400, the set-top box controller 409 can transmit the connection information to other connected display apparatuses.

On the other hand, upon receiving a control signal related to channel change from the connected display apparatuses 100, 200 and 300, the set-top box controller 409 provides the signal receiving part 401 with a tuning control signal to tune the channel. In addition, upon receiving a broadcasting signal corresponding to the tuned channel, the set-top box controller 409 controls an image signal to be transmitted to the display apparatuses that transmitted the control signal.

Hereinafter, a display apparatus according to a first exemplary embodiment of the present invention will be described with reference to FIG. 2 in conjunction with FIG. 1.

Figure 2:
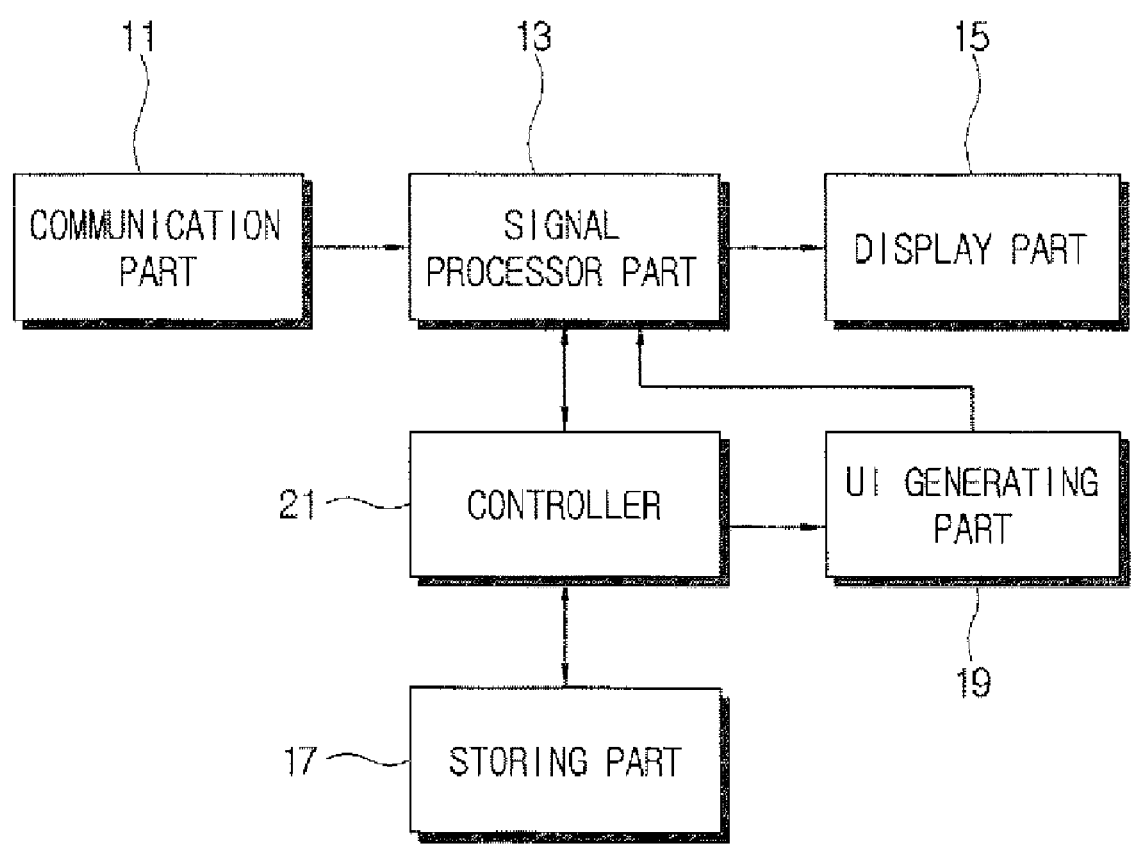
FIG. 2 is a control block diagram of a display apparatus according to an exemplary embodiment of the present invention.

FIG. 2 is a control block diagram of each of the display apparatuses 100, 200 and 300 according to a first exemplary embodiment of the present invention. As shown in FIG. 2, each of the display apparatuses 100, 200 and 300 comprises a communication part 11, a signal processor part 13, a display part 15, a user interface (UI) generating part 19, a storing part 17 and a controller 21.

The communication part 11 wirelessly communicates with the set-top box 400 and corresponds to the set-top box communication part 403 provided in the set-top box 400. The communication part 11 may comprise a wireless receiver (hereinafter referred to as an Rx module) to meet IEEE 802.11A standards.

In this exemplary embodiment, the Rx module has identification information used to communicate with the set-top box 400. The identification information comprises a MAC address of the Rx module, which is used to communicate with the set-top box 400. When power is applied to the communication part 11, the communication part 11 determines whether or not there exists a Tx module having the same address as the address of the Rx module. If a Tx module having the same address is found, then the display apparatus 100, 200 or 300 is wirelessly connected to the set-top box 400.

The signal processor part 13 processes an image signal inputted from an external apparatus (for example, a video cassette recorder (VCR), a digital video disk (DVD) player, etc.) connected to a connecting part (not shown) and/or an image inputted from the set-top box 400 through the communication part 11 under control of the controller 21, and provides the processed image signal to the display part 15.

In addition, the signal processor part 13 may have a variety of functions corresponding to formats of inputted image signals. For example, the signal processor part 13 may have an analog/digital (A/D) converting function to convert inputted image signals of various formats into a digital image signal of a specified format, a digital decoding function, a scaling function to adjust a vertical frequency, resolution, picture aspect ratio, etc., for an inputted digital image signal and/or analog image signal in accord with an output format of a display (not shown), and a predetermined format converting function.

The display part 15 comprises a display (not shown) that receives an image signal from the signal processor part 13 and displays an image and a light emitting diode (LED) part (not shown) that is turned on/off under control of the controller 21.

In this exemplary embodiment, the display (not shown) may be provided as a cathode ray tube (CRT), a liquid crystal display (LCD), a plasma display panel (PDP), or other displays for displaying images.

The LED part (not shown) comprises at least one LED, which indicates which of the display apparatuses 100, 200 and 300 included in the display system is connected to the set-top box 400. In this case, an order of the display apparatuses 100, 200 and 300 in which a connection state is indicated in correspondence to an arrangement order of the LEDs may be set by a user, for example.

The storing part 17 stores identification information to distinguish among the display apparatuses 100, 200 and 300. The storing part 17 may be embodied by a register, an EEPROM, an EPROM and the like, or any device that can store the identification information, and may be set during the manufacture of the display apparatuses.

The UI generating part 19 generates a message to inform a user that the display apparatuses 100, 200 and 300 are connected to the set-top box 400, under control of the controller 21, and may be embodied by an On Screen Display (OSD) generator. The generated message is displayed on the display (not shown).

Upon receiving the connection information from the set-top box 400 through the communication part 11, the controller 21 controls the received connection information so as to be displayed on the display part 15. The controller 21 may be embodied by a controller such as a CPU, a microcomputer or the like.

Specifically, the controller 21 checks whether or not the connection information is received from the set-top box 400 connected to the communication part 11. Upon receiving the connection information from the set-top box 400, the controller 21 controls the UI generating part 19 to generate a message that informs the user that the display apparatuses 100, 200 and 300 are connected to the set-top box 400, based on the connection information.

In this exemplary embodiment, since the connection information includes information related to a connected display apparatus of the plurality of display apparatuses 100, 200 and 300 included in the display system, the controller 21 controls the UI generating part 19 to generate a message that informs the user which display apparatus is connected to the set-top box 400.

In addition, upon receiving the connection information from the set-top box 400, the controller 21 controls the LED part (not shown) to be turned on/off, based on the connection information. The LED part (not shown) comprises a plurality of LEDs corresponding to respective display apparatuses 100, 200 and 300. The controller 21 turns on an LED of the plurality of LEDs, which corresponds to a connected display apparatus, based on the connection information.

For example, it is assumed that the display system has three display apparatuses 100, 200 and 300, each of which has a corresponding LED, that is, a first LED indicating connection or disconnection of a first display apparatus 100, a second LED indicating connection or disconnection of a second display apparatus 200, and a third LED indicating connection or disconnection of a third display apparatus 300.

Assuming that the first and second display apparatuses 100 and 200 are connected to the set-top box 400, upon receiving the connection information from the set-top box 400, the controller 21 controls the first and second LEDs to be turned on, based on the received connection information.

On the other hand, the LED part (not shown) may be embodied by one LED that can indicate several colors, wherein each color is set to indicate connection or disconnection of a respective one of the display apparatuses, thereby allowing a user to know which display apparatus is connected to the set-top box 400, based on the connection information.

In addition, the controller 21 may transmit a control signal related to channel change to the connected set-top box 400. Further, upon receiving a broadcasting signal corresponding to a tuned channel, the controller 21 controls the received broadcasting signal to be transmitted to the display (not shown).

In this manner, when the plurality of display apparatuses is wirelessly connected to the set-top box 400, the user can know whether or not a display apparatus used by the user is wirelessly connected to the set-top box 400 without difficulty and can also know which of the display apparatuses is wirelessly connected to the set-top box 400.

Hereinafter, a display apparatus according to a second exemplary embodiment of the present invention will be described with reference to FIGS. 1 and 2. In the following description of the second exemplary embodiment, the same elements as the display system of the first exemplary embodiment are denoted by the same reference numerals, and explanations thereof will be omitted if necessary.

As shown in FIG. 1, the set-top box 400 further comprises a set-top box display part 405. The set-top box display part 405 may be embodied, for example, by a display (not shown) and/or a plurality of LEDs (not shown).

The set-top box controller 409 provides connection information to a connected display apparatus of the plurality of display apparatuses 100, 200 and 300 and controls information related to the connected display apparatus to be indicated on the set-top box display part 405.

For example, assuming that three display apparatuses 100, 200 and 300 can communicate with the set-top box 400 in the display system, the three display apparatuses 100, 200 and 300 are set to correspond to the plurality of LEDs (not shown) of the set-top box display part 405, respectively. When a display apparatus 100, 200 or 300 is connected to the set-top box 400, the set-top box controller 409 controls an LED corresponding to the connected display apparatus to be turned on. In addition, it is to be understood that the set-top box controller 409 controls the information related to the connected display apparatus of the three display apparatuses 100, 200 and 300 to be displayed on the display (not shown).

In addition, the display apparatus that receives the connection information displays the connection information on the display part 15, as described above.

On the other hand, the set-top box controller 409 may control the information on the connected display apparatus to be indicated on only the set-top box display part 405 without providing the connection information to the connected display apparatus.

In this manner, a user can know which of the display apparatuses is wirelessly connected to the set-top box 400 without difficulty and can know whether or not wireless communication is established.

Hereinafter, the display system according to the first exemplary embodiment will be described with reference to FIG. 3.

As shown in FIG. 3, it is assumed that the set-top box 400 can communicate with a first display apparatus 100 installed in a room 1, a second display apparatus 200 installed in a room 2, a third display apparatus 300 installed in a room 3, and that the first and third display apparatuses 100 and 300 are powered on.

The communication parts 11 of the first and third display apparatuses 100 and 300 search for a Tx module having the same address of an address of an Rx module.

When the first and third display apparatuses 100 and 300 are connected to the set-top box 400, the set-top box communication part 403 provides a connection signal to the set-top box controller 409. The set-top box controller 409 transmits connection information to the first and third display apparatuses 100 and 300, based on the connection signal provided from the set-top box communication part 403. The first and third display apparatuses 100 and 300, which receive the connection information, display on respective display parts 15 that the first and third display apparatuses 100 and 300 are connected to the set-top box 400, by using a message or an LED.

In this manner, a user who watches the first display apparatus 100 in the room 1 can know that the first display apparatus 100 is connected to the set-top box 400 and can know simultaneously that the third display apparatus 300 in the room 3 is connected to the set-top box 400.

Hereinafter, a control method of a display system comprising the plurality of display apparatuses 100, 200 and 300 and the set-top box 400 according to the above-described exemplary embodiments will be described with reference to FIGS. 4a and 4b.

Figure 4A:
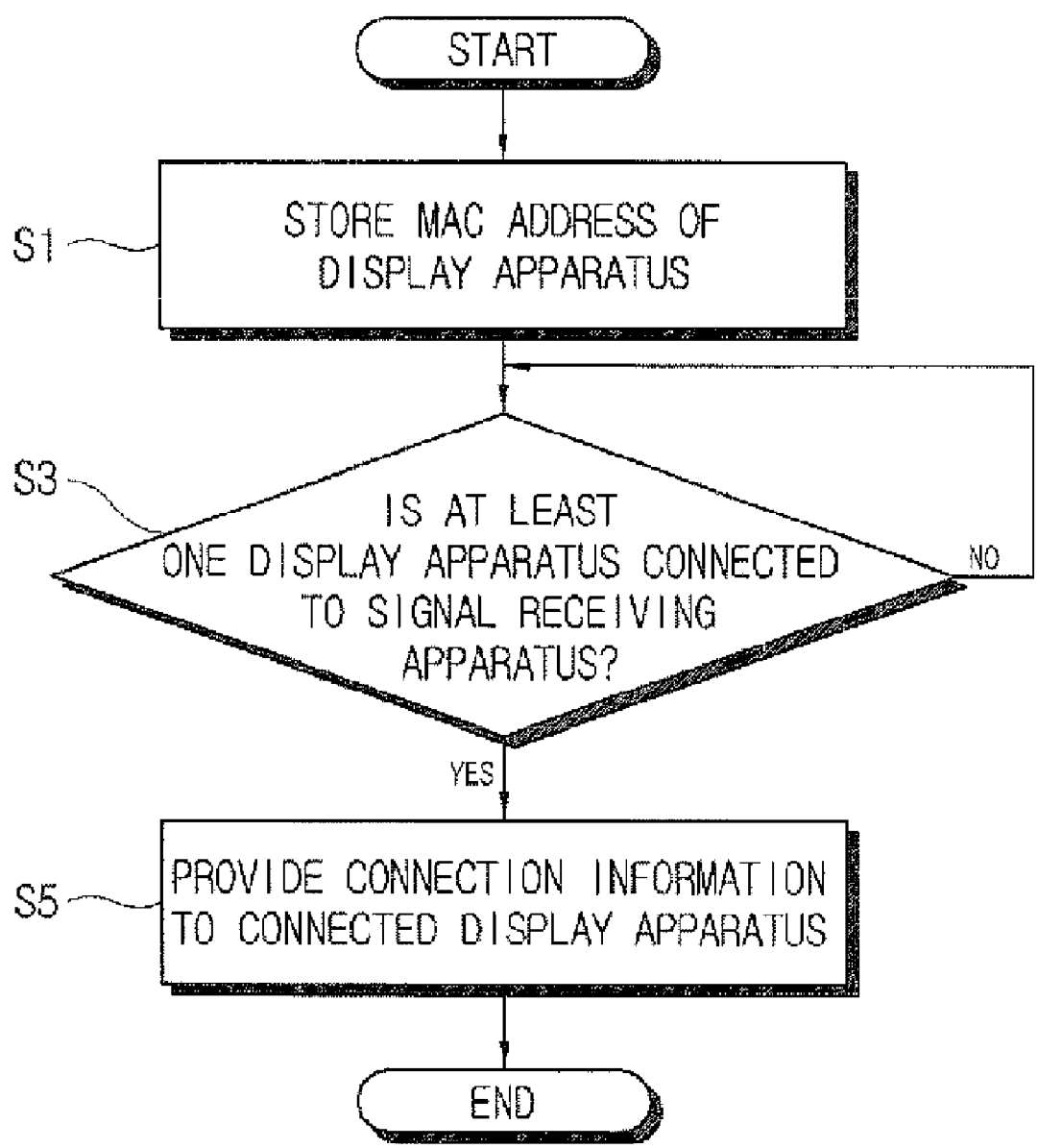
FIG. 4A is a flow chart illustrating a control method of a signal receiving apparatus of a display system according to an exemplary embodiment of the present invention.

As shown in FIG. 4A, the signal receiving apparatus 400 (hereinafter referred to as the set-top box 400) stores the same address as the MAC address of the Rx module of the communication part 11 of at least one of the plurality of display apparatuses 100, 200 and 300 in the Tx module of the set-top box communication part 403 at operation S1 in order to communicate with the at least one of the display apparatuses 100, 200 and 300.

Next, the set-top box controller 409 determines whether or not at least one of the plurality of display apparatuses 100, 200 and 300 is connected to the set-top box 400 through the set-top box communication part 403 at operation S3. If it is determined that the at least one display apparatus is connected to the set-top box 400, then the set-top box communication part 403 provides a connection signal to the set-top box controller 409, as described above.

Next, connection information is provided to the connected display apparatus at operation S5.

Figure 4B:
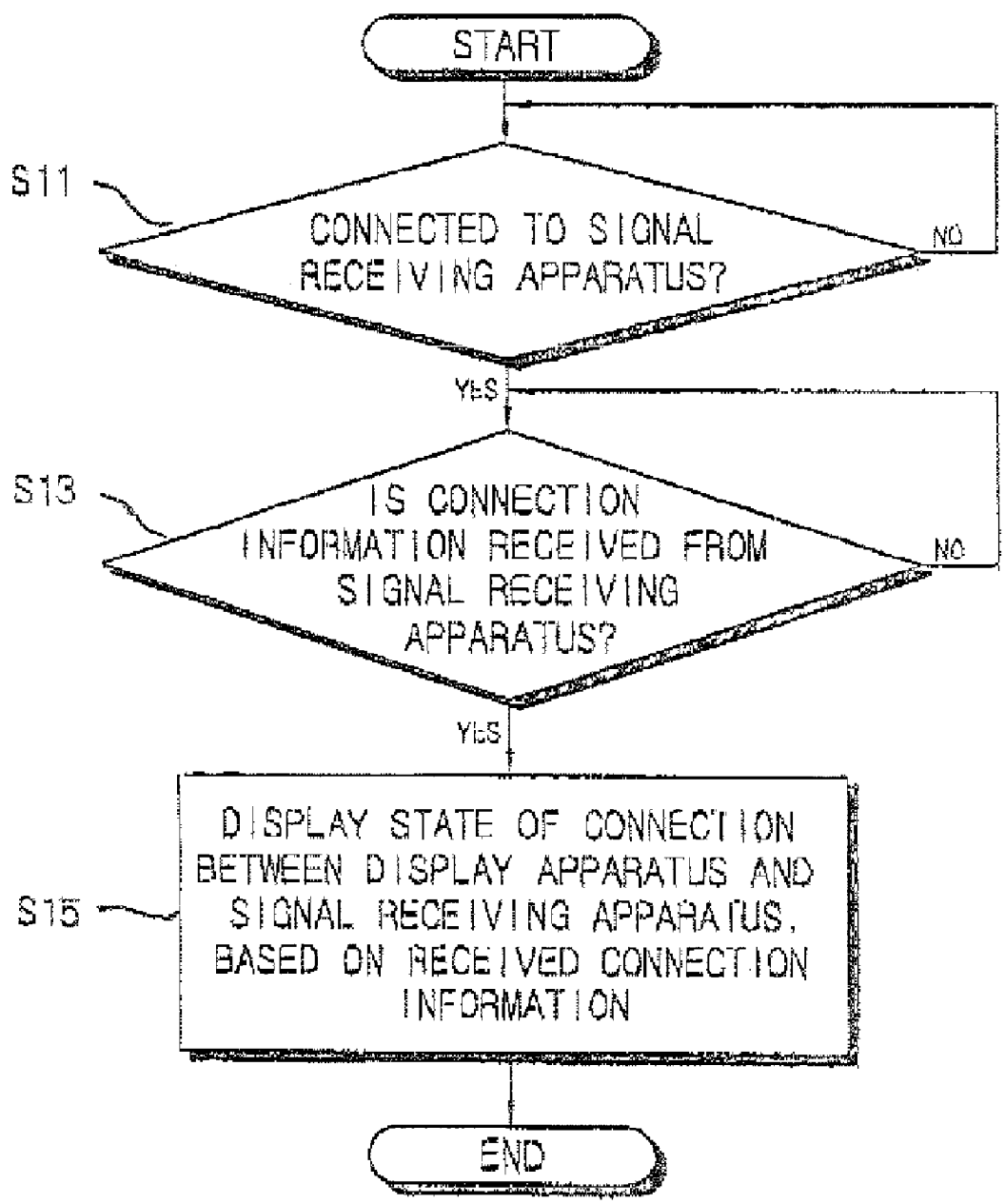
FIG. 4B is a flow chart illustrating a control method of the display apparatus of the display system according to an exemplary embodiment of the present invention.

As shown in FIG. 4B, a display apparatus determines whether or not it is connected to the signal receiving apparatus 400 (herein referred to as the set-top box 400) at operation S11. As described above, when power is applied to the communication part 11 of the display apparatus, the communication part 11 searches the Tx module having the same address as the address of the Rx module and tries to establish wireless communication with the set-top box 400.

If the display apparatus is connected to the set-top box 400, then the controller 21 determines whether or not the connection information is received from the set-top box 400 at operation S13.

If it is determined that the connection information is received from the set-top box 400, then the display apparatus displays which of the plurality of display apparatuses is connected to the set-top box 400 on the display part 15, based on the connection information at operation S15.

In this manner, a user can know whether or not the display apparatus is wirelessly connected to the set-top box 400. Further, since the user can confirm whether or not a display apparatus installed in a different space is powered on, it is possible to reduce power consumption by cutting off the power of a display apparatus that is not in use.

As apparent from the above description, exemplary embodiments of the present invention provide a signal receiving apparatus and a display apparatus, which are capable of allowing a user to confirm which of the display apparatuses installed in various spaces is connected to the signal receiving apparatus without difficulty, and a control method thereof.

In addition, exemplary embodiments of the present invention provide a signal receiving apparatus and a display apparatus, which are capable of informing a user whether or not a display apparatus used by the user is connected to the signal receiving apparatus without difficulty, informing a user when a plurality of display apparatuses is connected to the signal receiving apparatus, and a display system comprising the same.

Furthermore, according to exemplary embodiments of the present invention, since a user can confirm whether or not a display apparatus installed in a different space is powered on, it is possible to reduce power consumption by cutting off power of a display apparatus that is not viewed by the user.

Although a few exemplary embodiments of the present invention have been shown and described, it will be appreciated by those skilled in the art that various changes may be made in these exemplary embodiments without departing from the principles and spirit of the invention, the scope of which is defined in the appended claims and their equivalents.

What is claimed is:

1. A signal receiving apparatus comprising:
   a receiving part which receives a broadcast image signal, wherein the receiving part comprises a tuner which tunes the received broadcast image signal;
   a communication part which communicates with a plurality of display apparatuses, wherein the communication part is configured to communicate the tuned broadcast image signal to the plurality of display apparatuses; and
   a controller which determines whether at least one of the plurality of display apparatuses is currently connected to the signal receiving apparatus,
   wherein, if the controller determines that the at least one of the plurality of display apparatuses is currently connected to the signal receiving apparatus, then, in response to such a determination, the controller:
      controls connection information, indicating that the connected display apparatus is currently connected to the signal receiving apparatus, to be provided to the at least one of the plurality of display apparatuses; and
      controls the at least one of the plurality of display apparatuses to display an indication showing that the at least one of the plurality of display apparatuses is currently connected to the signal receiving apparatus along with an indication showing whether or not another of the plurality of display apparatuses is currently connected to the signal receiving apparatus.

2. The signal receiving apparatus according to claim 1, wherein if the controller determines that the plurality of display apparatuses is currently connected to the signal receiving apparatus, then, in response to such a determination, the controller:
   provides the connection information to the plurality of connected display apparatuses; and
   controls each one of the plurality of display apparatuses to display an indication showing whether or not each respective one of all of the plurality of display apparatuses is currently connected to the signal receiving apparatus.

3. The signal receiving apparatus according to claim 1, wherein if the controller determines that the plurality of display apparatuses is currently connected to the signal receiving apparatus, then, in response to such a determination, the controller:
provides the connection information to one of the plurality of connected display apparatuses; and
then controls the one of the plurality of connected display apparatuses to display an indication showing whether or not each respective one of all of the plurality of display apparatuses is currently connected to the signal receiving apparatus.

4. The signal receiving apparatus according to claim 3, wherein the one of the plurality of connected display apparatuses to which the connection information is provided is specified by a user.

5. The signal receiving apparatus according to claim 1, further comprising a display part, wherein the controller controls the indication showing that the at least one of the plurality of display apparatuses is currently connected to the signal receiving apparatus along with the indication showing whether or not another of the plurality of display apparatuses is currently connected to the signal receiving apparatus, to be displayed on the display part.

6. The signal receiving apparatus according to claim 1, wherein the communication part complies with IEEE 802.11A communication standards.

7. A display apparatus that receives a tuned broadcast image signal from a signal receiving apparatus, which tunes a received broadcast image signal, the display apparatus comprising:
a communication part which communicates with the signal receiving apparatus and receives the tuned broadcast image signal from the signal receiving apparatus;
a display part which displays an image based on the received tuned broadcast image signal; and
a controller which receives connection information from the signal receiving apparatus,
wherein, in response to the received connection information, the controller controls the display part to display an indication, showing whether or not the display apparatus is currently connected to the signal receiving apparatus along with an indication showing whether or not another display apparatus is currently connected to the signal receiving apparatus.

8. The display apparatus according to claim 7, further comprising a user interface (UI) generating part,
wherein the display part comprises a display, and
wherein the controller controls the UI generating part to display the indication, showing whether or not the display apparatus is currently connected to the signal receiving apparatus along with the indication showing whether or not another display apparatus is currently connected to the signal receiving apparatus on the display.

9. The display apparatus according to claim 7, wherein the display part comprises at least one light-emitting diode (LED), and
wherein the controller controls the indication, showing whether or not the display apparatus is currently connected to the signal receiving apparatus along with the indication showing whether or not another display apparatus is currently connected to the signal receiving apparatus, to be displayed using the LED.

10. The display apparatus according to claim 7, wherein the communication part complies with IEEE 802.11A communication standards.

11. A control method of a signal receiving apparatus comprising a communication part which communicates with a plurality of display apparatuses, the method comprising:
determining whether at least one of the plurality of display apparatuses is currently connected to the signal receiving apparatus through the communicating part; and
if it is determined that at least one of the plurality of display apparatuses is currently connected to the signal receiving apparatus, then in response to such a determination:
providing connection information, indicating that the at least one of the plurality of display apparatuses is currently connected to the signal receiving apparatus, to the at least one of the plurality of display apparatuses through the communicating part;
displaying, by the at least one of the plurality of display apparatuses, an indication showing that the at least one of the plurality of display apparatuses is currently connected to the signal receiving apparatus along with an indication showing whether or not another of the plurality of display apparatuses is currently connected to the signal receiving apparatus;
receiving, by the signal receiving apparatus, a broadcast image signal;
tuning, by the signal receiving apparatus, the received broadcast image signal; and
communicating, by the signal receiving apparatus, the tuned broadcast image signal to the currently connected display apparatus.

12. The control method according to claim 11, wherein a plurality of display apparatuses is currently connected to the signal receiving apparatus, and
wherein the connection information is provided to the plurality of currently connected display apparatuses so that each one of the plurality of currently connected display apparatuses displays an indication showing whether or not each respective one of all of the plurality of display apparatuses is currently connected to the signal receiving apparatus.

13. The control method according to claim 11, wherein the providing the connection information comprises:
selecting a display apparatus, from among the plurality of display apparatuses, to be provided with the connection information;
providing the connection information to the selected display apparatus; and
displaying, by the selected display apparatus, an indication showing whether or not each respective one of all of the plurality of display apparatuses is currently connected to the signal receiving apparatus.

14. The control method according to claim 11, wherein the displaying comprises displaying the indication showing that the at least one of the plurality of display apparatuses is currently connected to the signal receiving apparatus along with the indication showing whether or not another of the plurality of display apparatuses is currently connected to the signal receiving apparatus, on a display part.

15. The control method according to claim 11, wherein the communication part complies with IEEE 802.11A communication standards.

16. A control method of a display apparatus that receives a tuned broadcast image signal from a signal receiving apparatus, which tunes a received broadcast image signal, the method comprising:
receiving connection information from the signal receiving apparatus;
in response to the received connection information, displaying an indication that the display apparatus is currently connected to the signal receiving apparatus along with an indication showing whether or not another display apparatus is currently connected to the signal receiving apparatus;

receiving, by the display apparatus, the tuned broadcast image signal from the signal receiving apparatus; and displaying, by the display apparatus, an image based on the received tuned broadcast image signal.

17. The control method according to claim 16, wherein the displaying comprises displaying the indication that the display apparatus is currently connected to the signal receiving apparatus along with the indication showing whether or not another display apparatus is currently connected to the signal receiving apparatus, as a predetermined message.

18. The control method according to claim 16, wherein the displaying comprises displaying the indication that the display apparatus is currently connected to the signal receiving apparatus along with the indication showing whether or not another display apparatus is currently connected to the signal receiving apparatus, using an LED.

19. The control method according to claim 16, wherein communication between the display apparatus and the signal receiving apparatus complies with IEEE 802.11A communication standards.

20. The signal receiving apparatus according to claim 1, wherein, if the controller determines that the at least one of the plurality of display apparatuses is not currently connected to the signal receiving apparatus, then, in response to such a determination, the controller:

controls connection information, indicating that the at least one of the plurality of display apparatuses is not currently connected to the signal receiving apparatus, to be provided to the another of the plurality of display apparatuses; and controls the another of the plurality of display apparatuses to display an indication showing that the at least one of the plurality of display apparatuses is not currently connected to the signal receiving apparatus.

* * * * *